Patented June 15, 1943

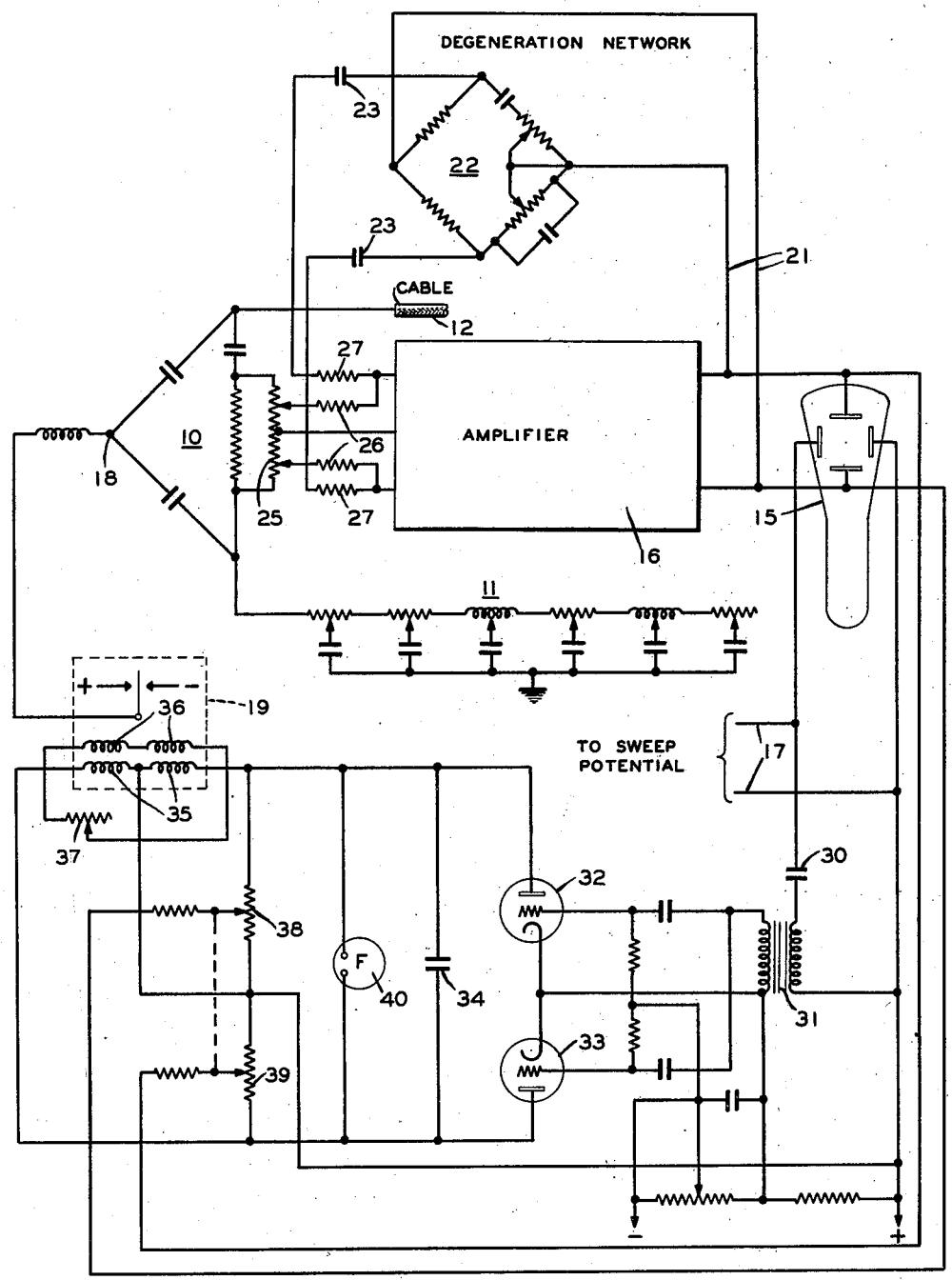

2,321,649

UNITED STATES PATENT OFFICE 2,321,649

CABLE BALANCING METHOD AND APPARATUS

William D. Buckingham, Southampton, N. Y., assignor to The Western Union Telegraph Company, New York, N. Y., a corporation of New York Application August 3, 1940, Serial No. 351,025

6 Claims. (Cl. 178—69)

This invention relates to a method of and apparatus for balancing a cable.

In my prior Patent No. 2,186,006, granted January 9, 1940, I have described an arrangement for locating unbalance in an artificial line for duplex signaling circuits, and more particularly for cables. This arrangement involved the use of an amplifier and an indicator, such as a cathode ray tube. The present invention relates to an improvement in cable balancing methods and apparatus of this character.

The primary object of the present invention is to simplify the operation of balancing the cable by providing an improved arrangement for locating minute unbalanced characteristics in the artificial line. Although the invention is described with reference to an artificial line for a cable where the problem of unbalance is of especial importance, it may be employed in balancing any duplex system.

The single figure of the drawing is a circuit diagram of a preferred embodiment of the invention.

In accordance with the invention an amplifier is connected across the bridge or duplex circuit between the line or cable and the artificial line, said amplifier being arranged to amplify only one frequency component or harmonic of the signals applied to the cable. When the artificial line has been properly adjusted so that no unbalance exists for one particular frequency component, the characteristics of the amplifier are changed so that the balance may be checked for another frequency component. Since the higher harmonics do not penetrate into the cable and artificial line as far as the lower harmonics, the artificial line may be adjusted from point to point beginning with the front end of the artificial line so that compensating adjustments for components of one frequency will not unbalance the artificial line for other components. In this manner the artificial line may be quickly adjusted to match the characteristics of the cable.

In accordance with another feature of the invention, test signals of any desired frequency are applied to the cable and artificial line by a relay which is driven from the adjustable sweep circuit of the cathode ray tube where such a tube is employed to indicate the existence of an unbalanced potential between the cable and the artificial line. Since the usual cathode ray tube equipment includes means for varying the frequency and amplitude of the sweep circuit potential over wide ranges, the frequency of the signals applied to the system may be rapidly varied over a wide range to check the balance existing at widely varying frequencies.

Referring to the drawing, the conventional bridge duplex system 10 is shown connected between an artificial line 11 and a cable 12. The artificial line 11 may be of any conventional type and constructed to match the characteristics of the cable 12 as closely as possible. As is well understood by those skilled in the art, the cable must be balanced from time to time, this procedure involving the adjustment of the elements of the artificial line 11 in order to secure a more perfect matching of the characteristics of the cable 12.

In the preferred embodiment of the invention, a cathode ray tube 15 is connected through an amplifier 16 having zero phase shift to the terminals of the bridge 10 whereby small unbalance potentials appearing across the terminals of the bridge may be readily detected by observing the screen of the cathode ray tube. This general arrangement is similar to that shown in my prior patent referred to above.

The control equipment associated with the usual cathode ray tube includes an adjustable source of sweep potential connected through the conductors 17 to the sweep plates of the cathode ray tube and adapted to be readily adjusted over a wide range of frequency and magnitude. As shown, test signals are applied to the apex 18 of the bridge 10 through the contacts of a polar relay 19 which is operated from the source of sweep potential whereby the variations in the sweep potential occur in synchronism with the signals impressed upon the cable and artificial line.

In accordance with the present invention the amplifier 16 is arranged to amplify only a single frequency component of the unbalance potential occurring across the bridge 10 but the particular frequency amplified may be varied over a suitable range. In the preferred embodiment of the invention a conventional high-gain direct current amplifier is employed and the output circuit of said amplifier is connected through the conductors 21 and a degeneration network 22 to the input circuit of the amplifier to sharply reduce the gain of the amplifier for all except the single desired frequency. In the particular embodiment shown in the drawing, the network 22 consists of a Wein bridge comprising four arms containing resistance and capacity. The characteristic of this bridge is that it is balanced for one particular frequency so that no voltage appears between the upper and lower terminals of the bridge when a potential of this frequency is impressed upon the other terminals. For higher and lower frequencies impressed upon the bridge through the conductors 21, a potential is fed back through the coupling condensers 23 to the input circuit of the amplifier 16 in the proper phase relation and amplitude to sharply reduce the gain of the amplifier for those frequencies. The frequency component for which the network 22 is balanced is amplified by the amplifier 16 and impressed upon the deflecting electrodes of the cathode ray tube 15. The input circuit of the amplifier 16 may be derived from a potentiometer 25, connected to the bridge 10, and series resistances 26 and 27, for example of one-half megohm, may be connected between the bridge and the amplifier and the network and the amplifier respectively, to separate the bridge and network in such a manner that they do not react on each other. Since the input circuit of the amplifier includes the grid circuit or circuits of vacuum tubes and does not carry current, the magnitude of the resistances 26 and 27 is unimportant so long as it is sufficiently large to avoid reaction between the bridge and feedback circuit as described.

In accordance with another feature of the invention the sweep circuit is connected through a condenser 30 and the coupling transformer 31 to the input circuits of two gas filled tubes 32 and 33 in accordance with the conventional arrangement shown whereby each alternate sweep circuit impulse causes the tubes 32 and 33 to become conducting alternately on successive impulses. The condenser 34 connected between the anodes of said tubes extinguishes one tube when the other tube flashes. The relay 19 is provided with windings 35 connected to the respective discharge tubes 32 and 33 whereby the armature of said relay is actuated first against one contact and then the other contact upon alternate impulses derived from the sweep circuit. Relay 19 may also be provided with a winding or windings 36 which are short-circuited through a variable resistance 37 to control the time when the armature of the relay moves from one contact to the other and thereby vary the image of the unbalance current on the screen of the cathode ray tube 15. As shown, potentiometers 38 and 39 are connected in parallel with the windings 35 of relay 19 to derive an auxiliary potential for controlling the deflection plates of the cathode ray tube 15 to further change the image on the screen of the tube 15. A frequency meter 40 may also be connected across the output circuits of the tubes 32 and 33 in order to provide an indication of the frequency of the sweep circuit potential variation.

In balancing the cable, the frequency selective amplifier 16 may be adjusted to pass a high frequency, say 510 cycles per second, which may correspond to the fifty-first harmonic. If any variation in the trace on the screen of the cathode ray tube is observed, the existence of an unbalance is shown and the fact that it contains a high frequency component indicates that the unbalance must be close to the head end of the artificial line. The exact section to which a correction must be applied to neutralize the unbalance is then found by trial. The particular section involved is indicated when a correction applied to it does not shift the phase of the unbalance pattern on the cathode ray tube screen but merely changes its amplitude. The nature of the correction required, i. e., resistance-capacity ratio, leak to earth, negative reactance or positive reactance, is determined by trial. When the correct adjustment has been made, the tuning of the selective amplifier is lowered in frequency by adjustment of the network 22 until another unbalance component is indicated, this being corrected by the same procedure. After the entire range of frequencies down to the actual signaling fundamental frequency has been covered, the amplification of the amplifier 16 may be increased and the steps set forth above repeated. It will be understood that the tuning of the selective amplifier 16 is effected by changing the variable resistances of the Wein bridge 22.

It will be evident that the balancing method according to the invention involves relatively simple adjustments and does not require a high degree of skill to interpret the pattern formed by the screen of the cathode ray tube or to decide what adjustments are required to correct the unbalance. The balance may readily be carried to any desired degree of perfection and the matching of the artificial line to the characteristics of the cable accomplished in a relatively short time.

While I have described one embodiment of the invention in detail for the purposes of explanation, I do not consider that the invention is limited to the specific arrangement illustrated.

I claim:

1. The method of balancing a circuit and an artificial line which consists in impressing cyclic current impulses on said circuit and artificial line, selectively amplifying a single frequency component of the unbalance current resulting from mismatching of said circuit and artificial line when said impulses are simultaneously applied thereto while electrically neutralizing the other frequency components resulting from said mismatching, producing a visual indication of the magnitude of said single frequency component and adjusting the elements of the artificial line to reduce the magnitude of said component.

2. In testing equipment for electrical apparatus, means for impressing currents containing different frequency components upon said apparatus, means including a frequency-selective amplifier connected to said apparatus for segregating the different components of said impressed currents and a cathode ray tube having the deflection plates thereof connected to the output of said amplifier.

3. Apparatus for detecting unbalance between a cable and an artificial line comprising an amplifier arranged to amplify the unbalance voltage, means to adjust the gain of the amplifier for any desired frequency component or components of the unbalance voltage to amplify the same selectively and indicating means connected to the output of said amplifier.

4. In cable balancing apparatus, a cathode ray tube connected to indicate unbalance voltage, said tube having sweep plates and means for supplying sweep potential thereto, and means connected to said last-mentioned means for impressing test signals on the cable.

5. The combination with a line conductor and an artificial line, of means for impressing cyclic current impulses on said conductor and said artificial line, means for selectively amplifying a single frequency component or harmonic of the unbalance current, said amplifying means including an amplifier having input and output circuits and a frequency selective degeneration network connected between said input and output circuits, and current-indicating means connected to said amplifying means.

6. The combination with a line conductor and an artificial line, of means for impressing cyclic current impulses on said conductor and artificial line, adjustable means for selectively amplifying the frequency components or harmonics, one at a time, of the unbalance current, a cathode-ray tube having sweep plates and deflection plates, connections between said deflection plates and said amplifying means, and means for cyclically energizing said sweep plates substantially concurrently with said current impulses.

WILLIAM D. BUCKINGHAM.